E. D. COLLINS.
HAMES.
No. 180,462. Patented Aug. 1, 1876.
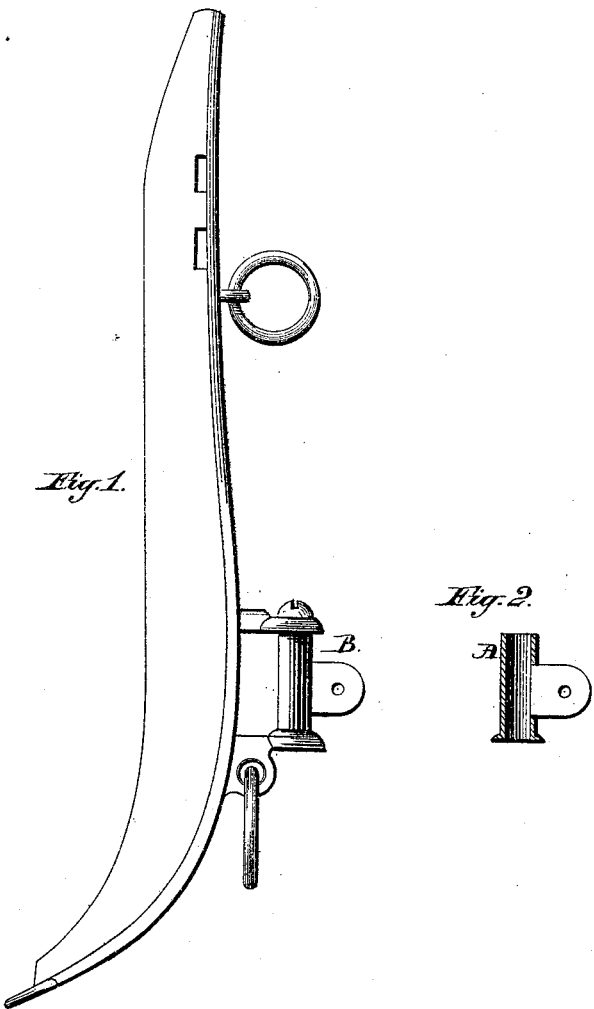

UNITED STATES PATENT OFFICE.

ELI D. COLLINS, OF CLAREMONT, NEW HAMPSHIRE.

IMPROVEMENT IN HAMES.

Specification forming part of Letters Patent No. 180,462, dated August 1, 1876; application filed March 25, 1876.

*To all whom it may concern:*

Be it known that I, ELI D. COLLINS, of Claremont, county of Sullivan and State of New Hampshire, have invented a Winged Thimble for a Bolt or Staple Hame to a Harness, of which the following is a specification:

The object of my invention is to protect the tug-leather attached to the bolt or staple of the hame of a harness so that the friction and wear shall come directly upon the thimble and bolt or staple, and not upon the leather.

The thimble is illustrated more in detail in the plan view, Fig. A, and is an iron tube with a wing so constructed as to slip on over the bolt or staple of the hame of the harness, with the tug-leather passing around said thimble, and the wing riveted between the folds of the leather, as illustrated by Fig. B in the plan when complete.

I claim as my invention--

The combination of a winged thimble, with a bolt or staple hame, to a harness, substantially as described in the foregoing specification.

Dated March 22, 1876.

ELI D. COLLINS.

Witnesses:
ALBERT H. DANFORTH,
E. B. HAYWOOD.